US008844389B2

United States Patent
Kopecek

(10) Patent No.: US 8,844,389 B2
(45) Date of Patent: Sep. 30, 2014

(54) AUTOMATICALLY LOCKING LINEAR ACTUATOR

(75) Inventor: Joseph Thomas Kopecek, Santa Clarita, CA (US)

(73) Assignee: Woodward HRT, Inc., Valencia, CA (US)

( * ) Notice: Subject to any disclaimer, the term of this patent is extended or adjusted under 35 U.S.C. 154(b) by 336 days.

(21) Appl. No.: 13/325,115

(22) Filed: Dec. 14, 2011

(65) Prior Publication Data

US 2013/0152717 A1 Jun. 20, 2013

(51) Int. Cl.
*F16H 3/06* (2006.01)
*F16H 27/02* (2006.01)
*F16H 29/02* (2006.01)
*F16H 29/20* (2006.01)

(52) U.S. Cl.
USPC ............... 74/89.39; 244/102 R; 74/89.23; 74/89.31

(58) Field of Classification Search
CPC . F16H 25/20; F16H 25/2204; F16H 25/2015; F16H 25/24; F16H 2025/2075; F16H 25/2454; F16H 2025/204; F16H 2025/2081; F16H 2025/209; F16H 25/2021; F16H 2025/2084; B64C 25/60; B64C 2025/325; B64C 25/14; B64C 25/34; B64C 25/16; B64C 2025/008; B64C 25/10; B64C 25/52; B64C 25/22; B64C 25/50; B64C 25/26; B64C 25/405
USPC ............ 74/89.23–89.25, 89.32–89.34, 89.37, 74/89.39; 244/101–104, 108; 91/41–49, 91/173
See application file for complete search history.

(56) References Cited

U.S. PATENT DOCUMENTS

| 2,782,766 | A | | 2/1957 | Bodem | |
|---|---|---|---|---|---|
| 3,134,997 | A | * | 6/1964 | Walker | 408/140 |
| 3,216,332 | A | * | 11/1965 | De Chambeau | 92/5 R |
| 3,521,314 | A | * | 7/1970 | Steiner | 408/139 |
| 3,649,129 | A | * | 3/1972 | King, Jr. | 408/139 |
| 4,222,253 | A | * | 9/1980 | Peitsmeier | 70/417 |
| 4,457,469 | A | * | 7/1984 | Ratchford | 439/312 |
| 4,463,661 | A | | 8/1984 | Tootle | |
| 4,491,059 | A | | 1/1985 | Martin | |
| 4,603,594 | A | | 8/1986 | Grimm | |
| 4,813,723 | A | * | 3/1989 | Anderson et al. | 292/336.3 |
| 6,722,485 | B1 | * | 4/2004 | Gitnes et al. | 192/223.1 |
| 6,837,461 | B1 | * | 1/2005 | Shiao | 244/129.5 |
| 7,137,595 | B2 | * | 11/2006 | Barba | 244/129.5 |
| 7,743,678 | B2 | * | 6/2010 | Wittkopp et al. | 74/339 |
| 7,802,488 | B2 | * | 9/2010 | Bucheton et al. | 74/89.23 |
| 2007/0220998 | A1 | * | 9/2007 | Kopecek | 74/89.39 |
| 2009/0194641 | A1 | | 8/2009 | Haase | |
| 2010/0162838 | A1 | * | 7/2010 | Hirai et al. | 74/89.33 |
| 2010/0242643 | A1 | * | 9/2010 | Waide | 74/89.26 |
| 2011/0042511 | A1 | * | 2/2011 | Elliott et al. | 244/102 R |

FOREIGN PATENT DOCUMENTS

| BR | PI0615667 A2 | 5/2011 |
|---|---|---|
| CA | 1201340 A1 | 3/1986 |
| CA | 2618455 A1 | 3/2007 |
| CN | 101273206 A | 9/2008 |

(Continued)

*Primary Examiner* — Troy Chambers
*Assistant Examiner* — Alexander Vu
(74) *Attorney, Agent, or Firm* — Fish & Richardson P.C.

(57) ABSTRACT

An automatically locking actuator includes a first end connector, a rotatable drive screw operably coupled to the first end connector, a nut assembly threadably mounted on the drive screw, a second end connector operably coupled to the nut assembly and a rotary lock having a rotor and where the actuator moves between extended and retracted positions in response to rotation of the rotor.

20 Claims, 5 Drawing Sheets

(56) References Cited

FOREIGN PATENT DOCUMENTS

| | | |
|---|---|---|
| DE | 102005042510 A1 | 3/2007 |
| EP | 0087255 A2 | 8/1983 |
| EP | 0090541 A2 | 10/1983 |
| GB | 604520 A | 7/1948 |
| GB | 704034 A | 2/1954 |
| GB | 2435877 A | 9/2007 |
| IL | 67889 A | 7/1986 |
| JP | 58156706 A | 9/1983 |
| JP | 58180807 A | 10/1983 |
| JP | 2009507197 A | 2/2009 |
| RU | 2008113068 A | 10/2009 |
| WO | 2007025843 A1 | 3/2007 |

* cited by examiner

AUTOMATICALLY LOCKING LINEAR ACTUATOR

BACKGROUND OF THE INVENTION

Conventional linear actuators may be automatically or manually driven from a rotary source. The actuator includes a mechanism to convert the rotary motion from the rotary source to a linear output motion to translate an external load, which may be accomplished by extending a ram. The actuator may have a lock mechanism to retain the ram in a fixed position, usually a retracted position, until power is applied to extend the ram. The lock is sequentially actuated to an unlocked state before the torque necessary to deploy the ram is applied. This is typically accomplished by a solenoid or electric motor mechanically linked to the lock mechanism and is separate from the drive motor that actuates the load. The use of a separate lock driver actuator increases the cost and complexity of the actuator. Separate dedicated actuation commands and logic devices are needed to control the lock and electrical wiring or hydraulic tubing may be required to transmit the commands to actuate the lock.

BRIEF DESCRIPTION OF THE INVENTION

In one embodiment, an automatically locking actuator includes a first end connector, a rotatable drive screw operably coupled to the first end connector, a nut assembly threadably mounted on the drive screw, a second end connector operably coupled to the nut assembly, a rotary lock comprising a rotor and at least one key assembly that moves between extended and retracted positions in response to rotation of the rotor, a keyway assembly having at least one keyway for receiving the at least one key assembly in the extended position, and a lost motion connector rotationally coupling the nut assembly to the rotary lock such that rotation of the drive screw results in an initial rotation of the nut assembly and rotor to move the key assembly between the extended and retracted positions prior to axial movement of the nut assembly along the drive screw in response to continued rotation of the drive screw.

DESCRIPTION OF EMBODIMENTS OF THE INVENTION

Figure 1:
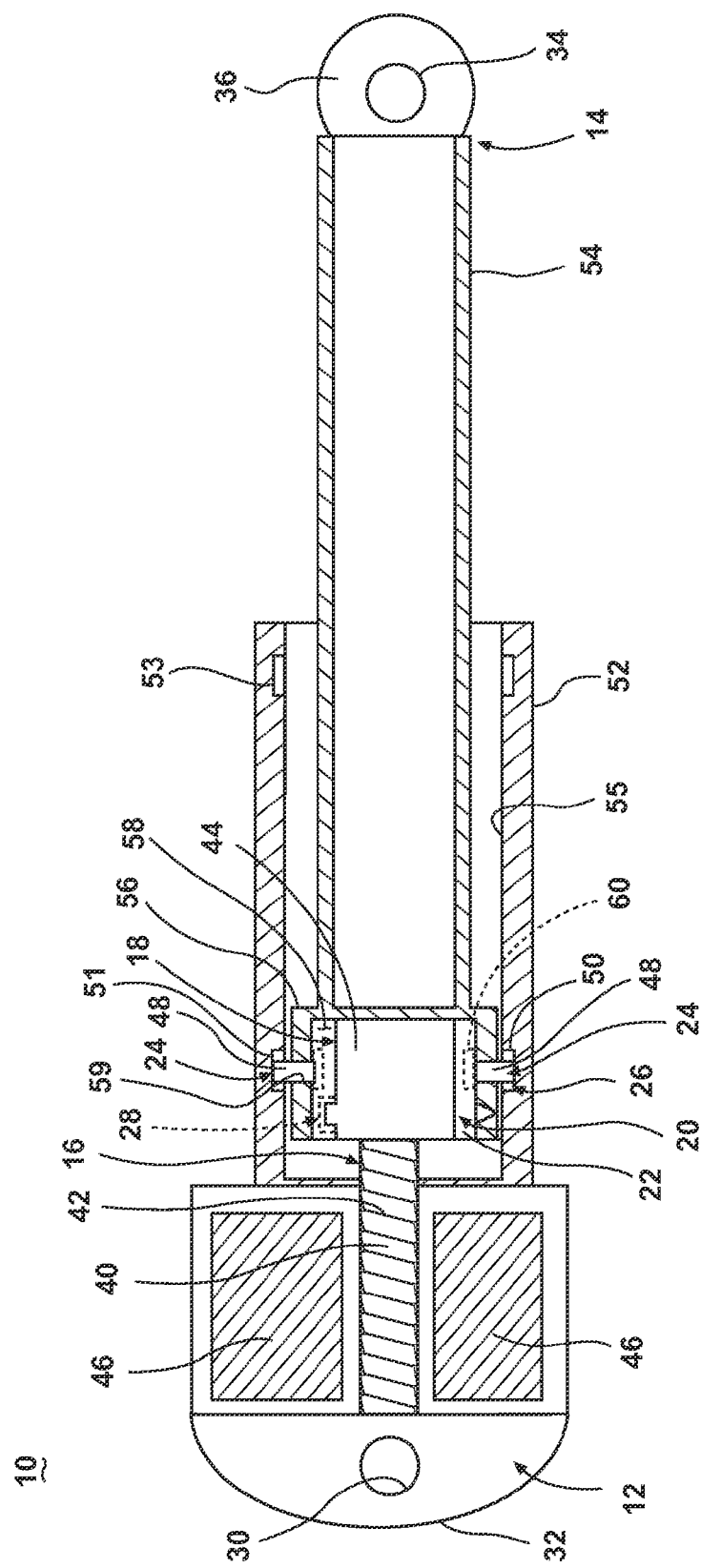
FIG. 1 is a cross-sectional view of an actuator according to an embodiment of the invention in a locked and stowed state.

Referring to FIG. 1, an actuator 10 is illustrated as including a first end connector 12, a second end connector 14, a rotatable drive screw 16, a nut assembly 18, a rotary lock 20 having a rotor 22 and at least one key assembly 24, a keyway assembly 26, and a lost motion connector 28. Such an actuator 10 may be used in a variety of environments including by way of non-limiting examples a door assembly or landing gear on an aircraft. More specifically, the first end connector 12 may include an eye 30 at its far end 32 to which a stationary member, such as a stationary portion of landing gear, may be attached. Alternatively, the first end connector 12 may be mounted in a stationary member such as a door casing. The second end connector 14 may also include an eye 34 at its far end 36 to which a member to be displaced may be attached. By way of non-limiting examples and correlating with the above examples, the eye 34 may be attached to the moveable portion of landing gear or a door, respectively.

The rotatable drive screw 16 may be operably coupled to the first end connector 12. The nut assembly 18 may be threadably mounted on the drive screw 16 and the second end connector 14 may be operably coupled to the nut assembly 18. It is contemplated that the drive screw 16 and nut assembly 18 may be any suitable configuration that may translate rotary motion of the drive screw 16 into linear, axial displacement of the nut assembly 18 and second end connector 14. By way of non-limiting example, the drive screw 16 may include a ball screw shaft 40 having external threads 42 which cooperate with a translating ball nut 44 forming the nut assembly 18. The ball nut 44 may embrace the ball screw shaft 40 and may be fixed in an end of the second end connector 14 such that rotation of the ball screw shaft 40 is translated into linear, axial displacement of the ball nut 44 and second end connector 14.

A motor assembly 46 may be coupled to the first connector 12 and configured to rotate the drive screw 16. The motor assembly 46 may be any suitable type of motor assembly 46 including by way of non-limiting examples an electric, hydraulic or pneumatic motor assembly that may provide a rotary drive source for the drive screw 16.

Figure 3:
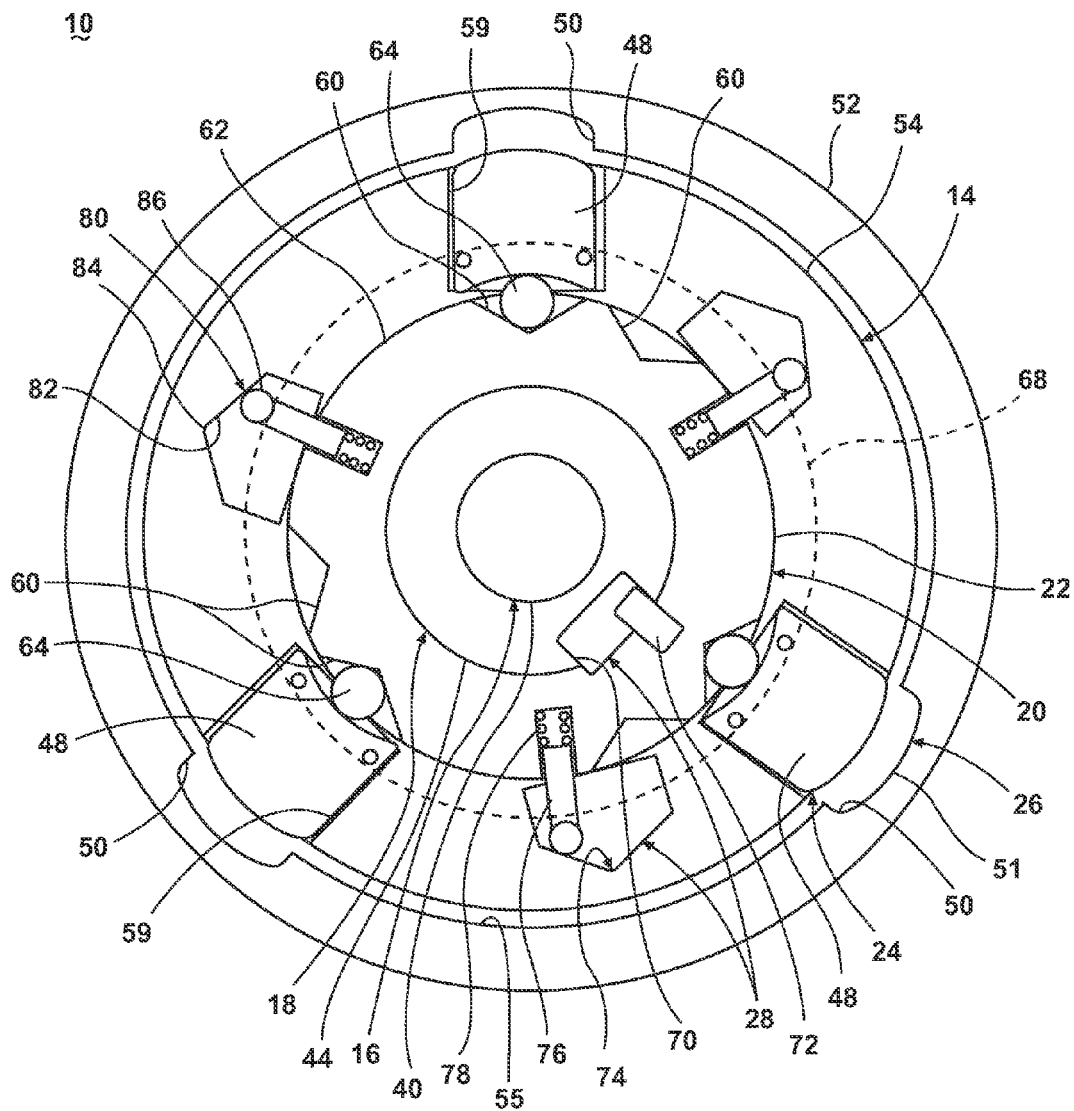
FIG. 3 is a cross-sectional view of the actuator of FIG. 1 in an unlocked state.

The rotary lock 20 may include the rotor 22 and at least one key assembly 24 that may move between an extended position as shown in FIG. 1 and a retracted position (FIG. 3) in response to rotation of the rotor 22. The key assembly 24 is illustrated as including multiple keys 48. The keyway assembly 26 may include corresponding keyways 50 for receiving the keys 48 when the key assembly 24 is in the extended position. By way of non-limiting example, multiple key assemblies 24 and corresponding keyway assemblies 26 have been illustrated and it is contemplated that any number of key assemblies 24 and corresponding keyway assemblies 26 may be included in the actuator 10 to allow for a number of locked positions of the actuator 10.

A casing 52 is illustrated as being coupled to the first end connector 12. The casing 52 may be formed in any suitable manner and has been shown in the form of a cylinder for illustrative purposes. The casing 52 may be coupled to the first end connector 12 in any suitable manner. A piston 54 may be slidably received within the casing 52 and the piston 54 may form the second end connector 14. The piston 54 may include a head 56 defining a hollow interior 58 in which the rotor 22 may be received. Multiple passages 59 may extend radially through the head 56 and each key 48 may be slidably received within the passage 59 allowing for radial motion of the key 48 during unlocking and locking.

It is contemplated that the casing 52 may form the keyway assembly 26. More specifically, at least one keyway 50 may be located on an inner surface 55 of the casing 52. Multiple keyways 50 have been illustrated as being included in the casing 52. By way of non-limiting example, a first keyway 51 is illustrated as being located at a first travel limit of the piston 54 and a second keyway 53 is illustrated as being located at a second travel limit of the piston 54. In this manner, the piston 54 may be locked by the keys 48 extending into either the first keyway 51 or the second keyway 53. It is contemplated that more keyways 50 may be located within casing 52 to allow for additional locking locations for the keys 48.

Figure 2:
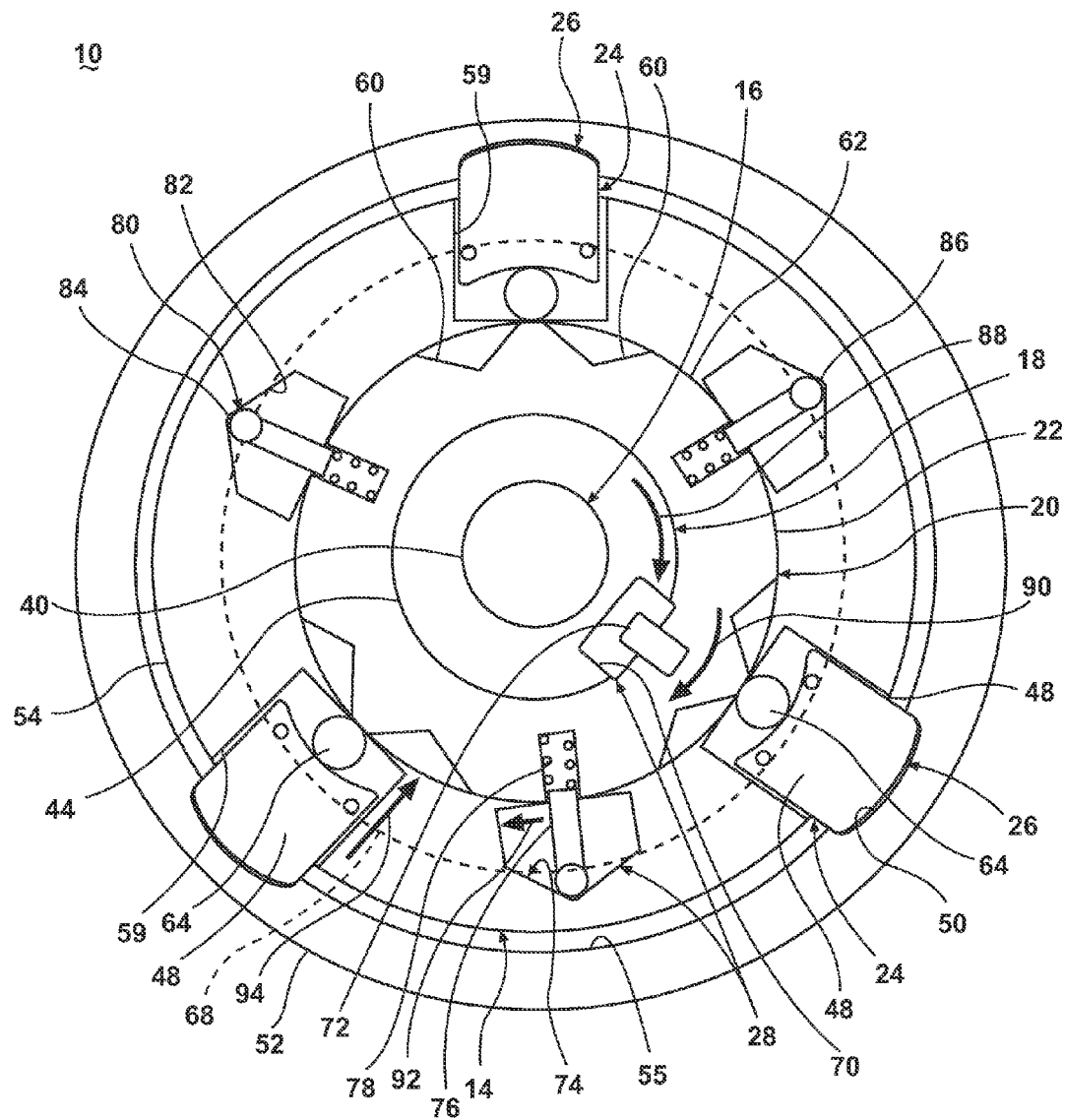
FIG. 2 is a cross-sectional view of the actuator of FIG. 1 in the locked state.

The components of the actuator will now be described in more detail with respect to FIG. 2. For example, a recess 60 is more clearly illustrated as being included in a peripheral edge 62 of the rotor 22. A bearing 64 is illustrated as being included in the key assembly 24 and abuts the peripheral edge 62 of the rotor 22. It may also be more clearly seen that a biasing element 68 may be operably coupled to the keys 48.

Further, it may be seen that a first recess and first tab 72 may be included in the lost motion connector 28. The first recess 70 may be included on one of the nut assembly 18 and the rotor 22 and a first tab 72 may project from the other of the nut assembly 18 and the rotor 22 and into the first recess 70. By way of non-limiting example, the first recess 70 is illustrated as being located in the nut assembly 18 and the first tab 72 projects from the rotor 22 into the first recess 70.

A second recess 74 on one of the rotor 22 and the second end connector 14 and a second tab 76 projecting from the other of the rotor 22 and the second end connector 14 and into the second recess 74 may also be included in the lost motion connector 28. By way of non-limiting example, the second recess 74 is illustrated in the piston 54 forming the second end connector 14 and the second tab 76 is illustrated as projecting from the rotor 22. A spring 78 may be included between the second tab 76 and a portion of the rotor 22 such that the second tab 76 may be biased away from the rotor 22. The first recess 70 and the second recess 74 may be formed by grooves within their respective components. The first recess 70 is illustrated as being larger than the first tab 72 and the second recess 74 is illustrated as being larger than the second tab 76 this may allow for the lost motion in the lost motion connector 28.

Regardless of their respective locations, the second recess 74 and second tab 76 may form a detent assembly 80 coupling the rotor 22 to the piston 54 forming the second end connector 14. The detent assembly 80 may include a centering device to center the second tab 76 within the second recess 74. By way of non-limiting example, the centering device may include a concave surface 82 forming a bottom 84 of the second recess 74 and a biasing element such as the spring 78. The concave surface 82 may, by way of non-limiting examples, include non-arcuate surfaces such as two converging linear surfaces, as illustrated, or may include a curved surface. A friction reducing element 86 may be included on the end of the second tab 76 to allow for easier movement of the second tab 76 over the concave surface 82. Such a friction reducing element 86 may be any suitable element to aid in the reduction of friction including, by way of non-limiting examples, a ball or cylinder formed on the end of the second tab 76. The gradual slope on the concave surface 82 and the friction reducing element 86 may both lower the friction between the second tab 76 and the concave surface 82 and allow for the detent spring force of the spring 78 to be minimized.

Initially, the operation will be described with respect to the actuator 10 being in the locked and stowed position. In such a position, the keys 48 are located in the keyways 50 and no movement of the actuator 10 is possible even when very high external tension or compression loads are applied to the far end 36 of the second end connector 14. During operation of the actuator 10, the lost motion connector 28 may rotationally couple the nut assembly 18 to the rotary lock 20 such that rotation of the drive screw 16 results in an initial rotation of the nut assembly 18 and rotor 22 to move the key assembly 24 between the extended and retracted positions prior to axial movement of the nut assembly 18 along the drive screw 16 in response to continued rotation of the drive screw 16. In this manner, priority is given to unlocking the actuator 10 before drive is applied to the nut assembly 18. In order to advance the piston 54, it is necessary for the piston 54 to become rotationally fixed relative to the rotatable drive screw 16.

When it is desired to unlock and deploy the actuator 10, the motor assembly 46 may be energized and drive torque may be applied to the rotatable drive screw 16. The rotatable drive screw 16 may engage the nut assembly 18 and rotate it as illustrated by the arrow 88. The first recess 70 on the nut assembly 18 is moved and engages the first tab 72 that extends from and is fixed to the rotor 22. This, in turn, causes the rotor 22 to rotate as illustrated by the arrow 90 and the rotor 22 overcomes the centering torque of the detent assembly 80 and thus the second tab 76 is caused to move within the second recesses 74 along the concave surface 82 as shown by arrow 92. This may, in turn, cause the spring 78 to be compressed. As the rotor 22 overcomes the centering torque of the detent assembly 80 and rotates the recesses 60 of the rotor 22 align with the keys 48 such that the bearing 64 may be received in the recess 60 so that the keys 48 are moved radially inward, as shown by arrow 94, towards the unlocked position shown in FIG. 3.

Figure 4:
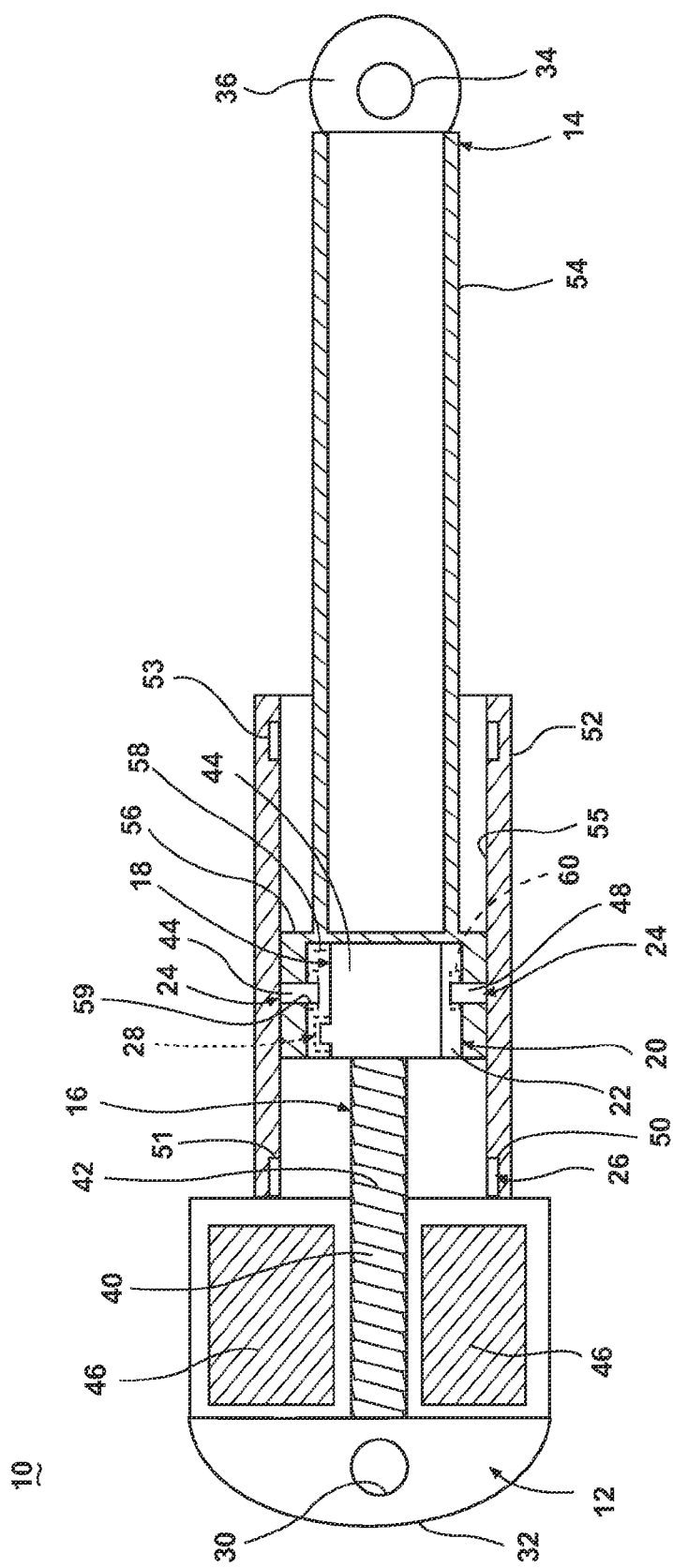
FIG. 4 is cross-sectional view of the actuator of FIG. 1 in an unlocked and partially extended state.

When the rotary lock 20 has moved to the unlocked position, the lost motion stroke ceases such that the rotary lock 20 becomes fixed once the lost motion is taken up and the nut assembly 18 begins translation of the piston 54. Thus, the keys 48 are disengaged from the casing 52 by rotation of the rotor 22 during the lost motion stroke and travel along with the piston 54 during actuator translation. More specifically, once the keys have been retracted, all input torque is applied to the rotatable drive screw 16, which drives the nut assembly 18 and piston 54 forwardly, to extend the piston 54 and the eye 34, which may be attached to a moveable member. The biasing element 68 may prevent the keys 48 from being displaced outwardly by gravity as the piston 54 is extended. Alternatively, the inner diameter of the casing 52 may retain the keys 48 in the unlocked position during translation. FIG. 4 illustrates the actuator 10 in such an unlocked and partially extended state.

Figure 5:
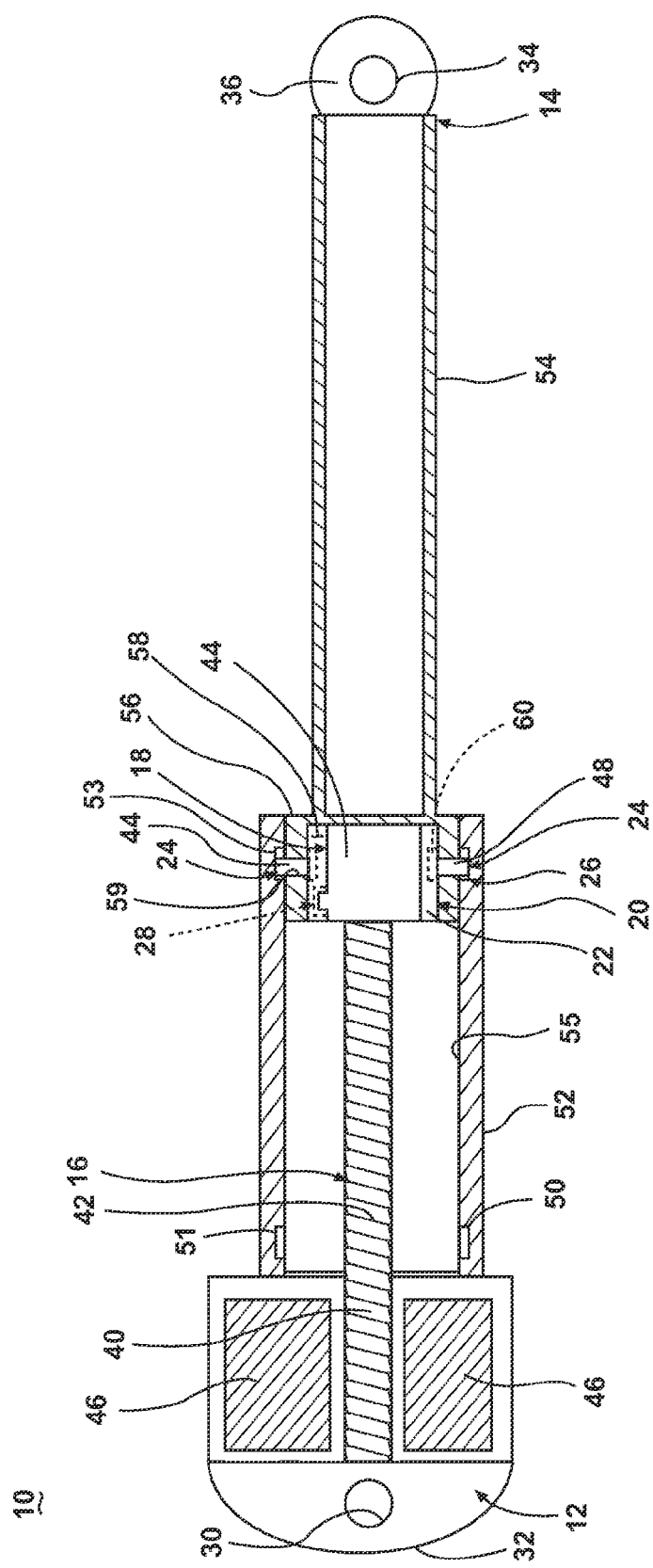
FIG. 5 is cross-sectional view of the actuator of FIG. 1 in a locked and extended state.

Upon completion of translation of the piston 54, the keys 48 are aligned with the keyways 53 in casing 52. When the motor assembly 46 is stopped, the spring loaded detent assembly 80, which is biased towards the locked position, acts to rotate the rotary lock 20 back towards the locked position. More specifically, when rotational input is no longer applied to the rotatable drive screw 16, the spring 78 may act as a biasing element and may urge the second tab 76 against the concave surface 82 such that a biasing force effects a rotation of the rotor 22 to center the second tab 76 in the bottom 84 of the concave surface 82. This effects movement of the rotor 22 in comparison to the piston 54, the bearing is moved out of the recess 60 and the keys 48 are again forced outwards until they engage with the keyways 50 in the casing 52 of the actuator 10. FIG. 5 illustrates the actuator 10 in such a locked and extended state.

When it is desired to unlock and translate the actuator 10 in the opposite direction, the direction of the input drive torque from the motor assembly 46 to rotatable drive screw 16 is reversed. Because the recesses 60 on the rotor 22 are symmetric, the unlocking process is accomplished in the opposite direction and the lost motion connector 28 causes the actuator 10 to unlock and retract in a reverse manner. Once the motor assembly 46 is stopped the spring loaded detent assembly 80, which is biased towards the locked position acts to rotate the rotary lock 20 back towards the locked position.

The above described embodiments provided a variety of benefits including those of a self-locking and unlocking assembly that preclude the need for a separate mechanical or electrical command or device to unlock or relock the actuator during normal operation. This reduces the weight of the actuator assembly and reduces the envelope requirement for both length and diameter as compared to conventional locking actuators that require a separate command to unlock the lock element. Both the reduction in weight and reduction in size may provide operational advantages. The above described embodiments maintain proven robustness and reliability and may be capable of locking in more than one position which may also minimize parts needed for the actuator assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automatically locking actuator, comprising:
   a first end connector;
   a rotatable drive screw operably coupled to the first end connector;
   a nut assembly threadably mounted on the drive screw;
   a second end connector operably coupled to the nut assembly;
   a rotary lock comprising a rotor and at least one key assembly that moves between extended and retracted positions in response to rotation of the rotor;
   a keyway assembly having at least one keyway for receiving the at least one key assembly in the extended position; and
   a lost motion connector rotationally coupling the nut assembly to the rotary lock in a configuration such that rotation of the drive screw results in an initial rotation of the nut assembly and rotor to move the key assembly between the extended and retracted positions, followed by axial movement of the nut assembly along the drive screw in response to continued rotation of the drive screw,
   wherein rotation of the drive screw while the key assembly is in the keyway results in moving the key assembly radially inward and axially moving the nut assembly along the drive screw.

2. The automatically locking actuator of claim 1 wherein the lost motion connector comprises a first recess on one of the nut assembly and the rotor and a first tab projecting from the other of the nut assembly and the rotor and into the first recess, with the first recess being larger than the first tab.

3. The automatically locking actuator of claim 2 wherein the lost motion connector further comprises a second recess on one of the rotor and the second end connector and a second tab projecting from the other of the rotor and the second end connector and into the second recess, with the second recess being larger than the second tab.

4. The automatically locking actuator of claim 3 wherein the first and second recesses are formed by grooves.

5. The automatically locking actuator of claim 1 wherein the lost motion connector comprises a detent assembly coupling the rotor to the second end connector.

6. The automatically locking actuator of claim 5 wherein the detent assembly comprises a recess on one of the rotor and the second end connector and a tab projecting from the other of the rotor and the second end connector and into the recess, with the recess being larger than the tab.

7. The automatically locking actuator of claim 6 wherein the detent assembly comprises a centering device to center the tab within the recess.

8. The automatically locking actuator of claim 7 wherein the centering devices comprises a concave surface forming a bottom of the recess and a biasing element urging the tab against the concave surface such that a biasing force effects a rotation of the rotor to center the tab in the concave surface.

9. The automatically locking actuator of claim 5 wherein the rotor further comprises a recess in a peripheral edge of the rotor and into which the key assembly may be received upon relative rotation of the rotor and the second end connector.

10. The automatically locking actuator of claim 9 wherein the key assembly further comprises a bearing abutting the peripheral edge of the rotor.

11. The automatically locking actuator of claim 9 wherein the second end connector comprises a passage and the key assembly comprises a key slidably received within the passage.

12. The automatically locking actuator of claim 11, further comprising a casing coupled to the first connector and a piston slidably received within the casing, with the casing forming the keyway assembly and the at least one keyway located on an inner surface of the casing, and the piston forming the second end connector.

13. The automatically locking actuator of claim 12 wherein the at least one keyway comprises a first keyway at a first axial travel limit of the piston and a second keyway at a second axial travel limit of the piston.

14. The automatically locking actuator of claim 13 wherein the piston comprises a head defining a hollow interior in which the rotor is received, and the passage extends radially through the head.

15. The automatically locking actuator of claim 14, further comprising a motor assembly coupled to the first connector and rotating the drive screw.

16. The automatically locking actuator of claim 15 wherein the drive screw is a ball screw and the nut is a ball nut.

17. The automatically locking actuator of claim 1 wherein the rotor further comprises a recess in a peripheral edge of the rotor and into which the key assembly may be received upon relative rotation of the rotor and the second end connector.

18. The automatically locking actuator of claim 1, further comprising a casing coupled to the first connector and a piston slidably received within the casing, with the casing forming the keyway assembly and the at least one keyway located on an inner surface of the casing, and the piston forming the second end connector.

19. The automatically locking actuator of claim 1, further comprising a motor assembly coupled to the first connector and rotating the drive screw.

20. The automatically locking actuator of claim 1 wherein the drive screw is a ball screw and the nut is a ball nut.

* * * * *